Figure 1:
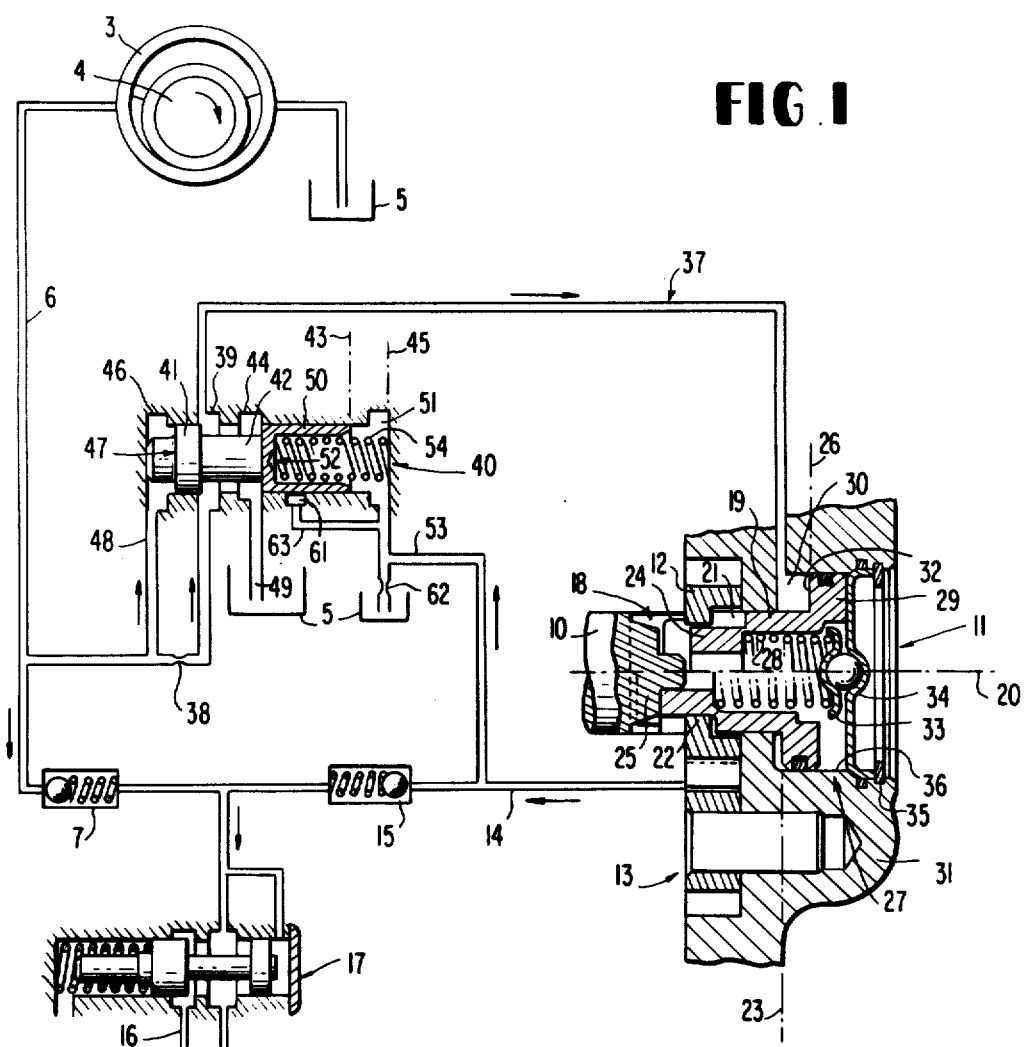

United States Patent [19]

Helmer et al.

[11] 4,150,543
[45] Apr. 24, 1979

[54] AUTOMATIC CHANGE-SPEED TRANSMISSION WITH A SECONDARY SERVO-GENERATOR FOR THE EMERGENCY SUPPLY OF AGGREGATES OF THE TRANSMISSION CONTROL AND SHIFTING SYSTEM OPERATING WITH A SERVO-FORCE

[75] Inventors: Josef Helmer, Aich; Hermann Gaus, Stuttgart, both of Fed. Rep. of Germany

[73] Assignee: Daimler-Benz Aktiengesellschaft, Fed. Rep. of Germany

[21] Appl. No.: 835,538

[22] Filed: Sep. 22, 1977

[30] Foreign Application Priority Data

Sep. 23, 1976 [DE] Fed. Rep. of Germany ....... 2642804

[51] Int. Cl.² .................. F15B 20/00; F15B 13/09
[52] U.S. Cl. .................................. 60/403; 60/486
[58] Field of Search .................... 60/403, 486, 428

[56] References Cited

FOREIGN PATENT DOCUMENTS 1185596 3/1970 United Kingdom ................ 60/403

Primary Examiner—Edgar W. Geoghegan
Attorney, Agent, or Firm—Craig & Antonelli

[57] ABSTRACT

An automatic change-speed transmission for vehicles with a drive connection between a transmission output shaft adapted to be coupled with vehicle wheels and a secondary servo-force generator for the emergency supply of aggregates of the transmission control and shifting system operating with a servo-pressure, which drive connection is adapted to be disconnected by a disengaging mechanism, and with a permanent drive connection between a transmission input shaft adapted to be driven by a driving engine and a primary servo-force generator for the normal supply of the aggregates; a servo-motor for the disengaging mechanism which is adapted to be displaced into a disengaging position disconnecting the secondary servo-force generator from the transmission output shaft is brought into its working position by a control device operating in dependence on the servo-force of the primary servo-force generator when the actual value of the servo-force lies below a necessary operating value.

16 Claims, 2 Drawing Figures

U.S. Patent  Apr. 24, 1979  4,150,543

AUTOMATIC CHANGE-SPEED TRANSMISSION WITH A SECONDARY SERVO-GENERATOR FOR THE EMERGENCY SUPPLY OF AGGREGATES OF THE TRANSMISSION CONTROL AND SHIFTING SYSTEM OPERATING WITH A SERVO-FORCE

The present invention relates to an automatic change-speed transmission for vehicles with a drive connection, adapted to be disengaged or separated by a disengaging mechanism, between a transmission output shaft adapted to be coupled with the vehicle wheels and a secondary servo-force generator for the emergency supply of aggregates of the transmission control and shifting system which operate with a servo-force, and with a continuous drive connection between a transmission input shaft adapted to be driven by a driving engine and a primary servo-force generator for the normal supply of the aggregates, and with a servo-motor actuating the disengaging mechanism, which is adapted to be displaced in dependence on an operating magnitude of the primary servo-generator into a disengaging position separating the secondary servo-force generator from the transmission output shaft, but which is in its working position putting the secondary servo-force generator into driving connection with the output shaft when the rotational speed of the transmission input shaft approaches zero.

With such change-speed transmissions, the secondary servo-force generator supplies for the aggregates the necessary energy in order to maintain an engaged speed of the change-speed transmission during tow-starting, i.e., when the vehicle is being towed or pushed, which enables the engine to be started. During the normal driving operation, the secondary servo-force generator, in contrast thereto, is disconnected or turned off to avoid power losses.

A change-speed transmission of the type described above corresponds to a non-public, internal state of development of the assignee of the present application. In this change-speed transmission, the servo-force of the primary servo-generator operates without further influence directly on the actuating member of the servo-motor actuating the disengaging mechanism. This may have as a consequence when tow-starting or push-starting the vehicle that the secondary servo-force generator becomes driveless before the driving engine runs by its own force or before the primary servo-force generator is able to take over the energy supply by itself. Consequently, the transmitting capability of the change-speed transmission would collapse by reason of the lack of energy, and the starting operation of the driving engine would not occur under unfavorable conditions by reason of an excessively low engine rotational speed.

The present invention is essentially concerned with the task making more safe the energy supply of the aggregates operated with servo-force in a change-speed transmission of the aforementioned type when attempting to start the vehicle by towing or pushing the same.

The underlying problems are solved according to the present invention in an advantageous manner in that the servo-motor of the disengaging mechanism is brought into its working position by a control device operating in dependence on the servo-force of the primary servo-generator, when the actual value of the servo-force lies below a required operating value.

In the change-speed transmission according to the present invention, the secondary servo-force generator is disengaged only when the primary servo-force generator is able to supply a sufficiently high servo-force for the supply of the aggregates alone by primary servo-force generator.

In order to avoid when tow-starting or push-starting the vehicle that the secondary servo-force generator is disengaged prior to the starting or prior to the termination of the starting operation of the driving engine, notwithstanding a sufficient energy output of the primary servo-force generator, it is advantageous in the change-speed transmission according to the present invention that the control device dependent on the primary servo-force generator is adapted to be overridden by a holding control device operating in dependence on the rotational speed of the transmission output shaft, which holds the servo-motor of the disengaging mechanism in the working position and releases its shifting control into the disengaging position only when the rotational speed approaches zero. As a result thereof, the secondary servo-force generator is disconnected only when the vehicle, after the tow-starting, has been stopped for the first time with a running engine, for example, in order to disconnect the towing cable. A premature disconnection or disengagement is avoided thereby with certainty.

In the change-speed transmission according to the present invention, the adjusting member of the control device dependent on the primary servo-force generator could operate, for example, against elastic or springy means matched in the prestress thereof to the requisite operating value of the servo-force, which elastic means retain the adjusting member in its position for the working position of the servo-motor of the disengaging mechanism.

In the change-speed transmission according to the confidential internal state of development of the assignee of the present invention, the primary and secondary servo-force generators operate onto a common working line, in which means are interconnected for equalizing the difference of the servo-forces of the two servo-force generators. In application of such an arrangement to the change-speed transmission according to the present invention, the matching of the elastic means to the required operating value of the servo-force in the control device dependent on the primary servo-force generator can be dispensed with, if the holding control device is influenced by the servo-force of the secondary servo-force generator and operates on the adjusting member of the control device dependent on the primary servo-force generator, which adjusting member is displaceable by spring force into the position corresponding to the working position. With this advantageous construction of the change-speed transmission according to the present invention, the servo-force of the secondary servo-force generator, which has been brought to the required operating value by the tow-start rotational speeds of the transmission output shaft during the tow-starting, takes over the measuring function of the prestressed elastic means. As a result thereof, only elastic means with a return function are still required for the adjusting member of the control device which can be dimensioned considerably more weakly.

If a vehicle is towed away, then the manual selector lever of the change-speed transmission might inadvertently be in a driving position. Since the secondary servo-force generator is being driven by the transmission output shaft with a non-driven or driveless transmission input shaft and consequently gives off energy to the aggregates of the transmission control and shifting system, the transmission input shaft would be brought into driving connection with the transmission output shaft and might put the driving engine under pushing operation. As a result thereof, the change-speed transmission can be damaged by slippage of the shifting clutches and brakes as also the driven driving engine by reason of inadequate lubricating conditions. The same conditions exist if—for example as a result of a collision or impact accident—the actuating linkage of the transmission control operatively connected with the manual selecting lever is so displaced that notwithstanding an engaged neutral position of the manual selector lever, the change-speed transmission is shifted into a driving position.

In order to protect the driving engine and the change-speed transmission against the damages described above during a tow-away, it is proposed for a change-speed transmission of the aforementioned type and especially for a change-speed transmission according to the present invention that the disengaging mechanism is equipped with means for the automatic locking of its disengaging position which are adapted to be selectively unlocked. In this manner, the secondary servo-force generator is normally out of operation—i.e., also when being towed away. For purposes of tow-starting or push-starting, the locking means would have to be selectively disengaged in order to permit the secondary servo-force generator to be driven by the transmission output shaft.

In the change-speed transmission according to the internal state of development of the assignee of the present invention, the aggregates of the transmission control and shifting system and the servo-motor of the disengaging mechanism are operated with servo-pressure. The common working pressure line of the aggregates is connected with the primary and secondary servo-pressure pump by way of one check valve each opening in the direction toward the aggregates. In application of the control according to the present invention of the servo-motor of the disengaging mechanism to this change-speed transmission, the arrangement is made in an advantageous manner such that a control slide valve member for the working pressure of the servo-motor of the disengaging mechanism is provided with two opposite control pressure surfaces and is adapted to be supported in one direction of the slide member axis against elastic means and the control pressure surface operating opposite to the elastic means is adapted to be acted upon by the feed pressure between the primary servo-pressure pump and the associated check valve and the other control pressure surface is adapted to be actuated by the feed pressure between the secondary servo-pressure pump and the associated check valve.

In the change-speed transmission according to the internal state of development of the assignee of the present invention, the secondary servo-force generator is formed by a piston pump which is adapted to be driven by way of an eccentric ring of the transmission output shaft. With this type of construction, a jamming of the piston, breaking of the piston rod, or a wear at the expensive eccentric ring may occur. Similarly, the non-uniformity of the feed stream of a piston pump is unfavorable for a control pressure. In contradistinction thereto, it is advantageous with the change-speed transmission according to the present invention operating with servo-pressure that the secondary servo-force generator is a gear pump. The gear pump is characterized by a simple construction and small structural space and is inexpensive in its manufacture by the use of sintered parts. Its feed stream is uniform.

Accordingly, it is an object of the present invention to provide an automatic change-speed transmission with a secondary servo-force generator for the emergency supply of aggregates of the transmission control and shifting system operating with servo-force, which avoids by simple means the aforementioned shortcomings and drawbacks encountered in the prior art.

Another object of the present invention resides in an automatic change-speed transmission with a secondary servo-force generator for the emergency supply of aggregates of the transmission control and shifting system operating with servo-force, in which the disengagement of the secondary servo-force generator is controlled more appropriately so as to permit the vehicle to be reliably started when being towed or pushed.

A further object of the present invention resides in an automatic change-speed transmission of the type described above in which the secondary servo-force does not lose its driving connection before the driving engine of the vehicle runs by its own force.

A still further object of the present invention resides in an automatic change-speed transmission with a secondary servo-force generator for the emergency supply of aggregates of the transmission control and shifting system operating with servo-force, which effectively prevents a collapse of the transmission capability of the change-speed transmission prior to the starting of the engine.

Another object of the present invention resides in an automatic change-speed transmission of the type described above in which the energy supply of the aggregates of the transmission control and shifting system which operate with servo-force, is rendered more safe, especially during push- or tow-starting of the vehicle.

Still another object of the present invention resides in an automatic change-speed transmission of the type described above, in which the secondary servo-force generator is disengaged only when the primary servo-force generator is able to provide a sufficiently high servo-force for the feed of the aggregates of the transmission control and shifting system.

A further object of the present invention resides in an automatic change-speed transmission with a secondary servo-force generator for the emergency supply of aggregates of the transmission control and shifting system which operate with a servo-force, in which damage to the transmission or the driving engine during push- or tow-starting can be far-reachingly avoided as a result of an improper operation and control of the secondary servo-force generator.

Still a further object of the present invention resides in an automatic change-speed transmission of the type described above which is relatively simple in construction and utilizes efficient pumps requiring relatively little space.

Figure 2:
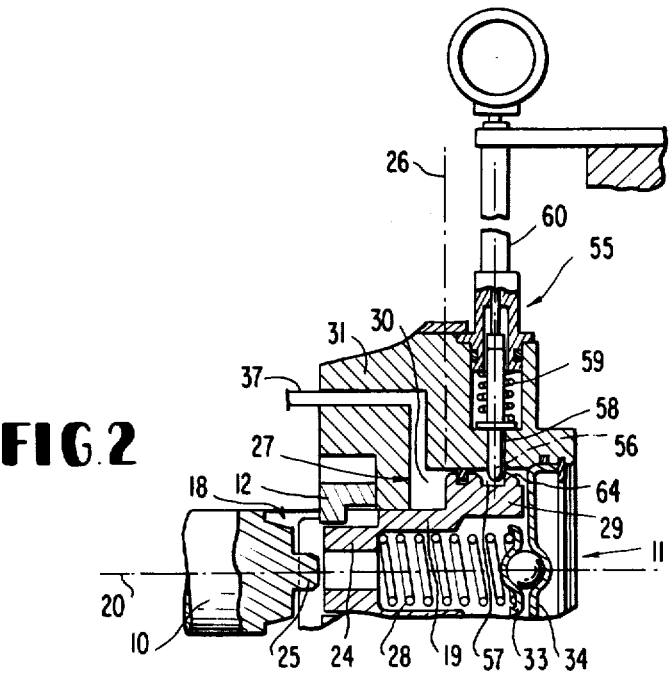

These and other objects, features and advantages of the present invention will become more apparent from the following description when taken in connection with the accompanying drawing which shows, for purposes of illustration only, two embodiments in accordance with the present invention and wherein:

FIG. 1 is a schematic view of a change-speed transmission in accordance with the present invention illustrating the mode of operation and control of the primary and secondary servo-pump in a change-speed transmission according to the present invention; and FIG. 2 is a partial schematic view of a modified embodiment of the disengaging mechanism in accordance with the present invention of the change-speed transmission of FIG. 1 with a selectively unlockable locking mechanism for the disengaging position of the disengaging mechanism.

Referring now to the drawing wherein like reference numerals are used throughout the two views to designate like parts, and more particularly to FIG. 1, a gear pump 3 operating as primary servo-pressure pump is driven from a transmission input shaft 4 of a change-speed transmission not illustrated in detail. The gear pump 3 draws-in pressure oil out of the oil sump schematically indicated by reference numeral 5 of the change-speed transmission and forces the same into a pump pressure line 6 which is connected by way of a check valve 7 with a common working pressure line generally designated by reference numeral 9 leading to aggregates of the transmission control and shifting system which operate with servo-pressure and are schematically indicated by block 8. The transmission input shaft 4 is adapted to be driven by a driving engine (not shown). A control shaft 10 in constant driving connection with a transmission output shaft (not shown) adapted to be coupled with vehicle wheels by way of gears, is adapted to be coupled by way of a disengaging mechanism generally designated by reference numeral 11 with the driving gear 12 of a gear pump generally designated by reference numeral 13 which operates as secondary servo-pressure pump. The gear pump 13 also sucks pressure oil out of the oil sump 5 and forces the same into a pump pressure line 14 which is connected by way of a check valve 15 with the common working pressure line 9. The check valves 7 and 15 which open in the direction toward the aggregates 8, safeguard the pressure oil supply of the aggregates 8 by one of the pumps 3 and 13 if the other pump should be without drive. A pressure control valve generally designated by reference numeral 17 and of any conventional construction which controls a connection between the common working pressure line 9 and a pressure-relieved zero connection 16 connected with the oil sump 5, assures by its bleeder valve function as an excess pressure valve that the pressures in the pump pressure lines 6 and 14 are equally large when both pumps 3 and 13 operate.

The disengaging mechanism 11 operates by means of a shifting claw clutch generally designated by reference numeral 18, by means of which the control shaft 10 is adapted to be coupled with a slide sleeve 19. Whereas the slide sleeve 19, arranged coaxially to the axis of rotation 20 of the control shaft 10 and of the gear 12, is arranged movable in the directions of the axis of rotation 20 with respect to the gear 12, the control shaft 10 is immovable in these directions with respect to the gear 12. The sliding sleeve 19, in contrast thereto, is non-rotatably connected with the gear 12 by way of a splined groove connection 21, 22 so as to rotate in unison therewith. In the working position 23 of the slide sleeve 19, its clutch claws 24 are in form-locking engagement with the clutch claws 25 of the control shaft 10 so that the gear pump 13 is in driving connection with the transmission output shaft. In the disengaging position 26 of the sliding sleeve 19, the clutch claws 24 and 25 are out of engagement so that the gear pump 13 is disconnected from the transmission output shaft.

The disengaging mechanism 11 is actuated by a pressure medium servo-motor generally designated by reference numeral 27 which operates by means of a compression spring 28 engaging the working position 23 and by means of a ring-shaped working piston 29 in one piece or integral with the sliding sleeve 19 whose piston pressure area 32 adapted to be acted upon by the working pressure in its working pressure chamber 30 in the pump housing 31, effects the shifting into the disengaging position 26. The compression spring 28 is clamped in between the clutch claws 24 and a spring plate 33 which together with the working piston 29—when the latter is in the disengaging position 26—are supported at an abutment plate 34. The abutment plate 34, in its turn, is supported at a retaining ring 35 which is inserted into a groove of the housing bore 36 for the working pressure chamber 30.

The working pressure chamber 30 is connected by way of a working pressure line 37 having a throttle 38 with the pump pressure line 6 of the gear pump 3. The section of the working pressure line 37 which is located between the throttle 38 and the working pressure chamber 30, is connected with a valve chamber 39 of a control slide valve 40 which is connected by way of a spool or collar 41 of the control slide valve member 42 with a valve chamber 44 in one slide member end position 43 for the working or operating position 23 and with a valve chamber 46 in the other slide member end position 45 for the disengaging position 26. The cross section of the collar 41 is equal to the effective cross section of the control pressure surface 47 of the control slide valve member 42 which is adapted to be acted upon by the pressure in the valve chamber 46 connected by way of a control pressure line 48 with the pump pressure line 6. The valve chamber 44 is in communication with the oil sump 5 by way of a pressure-relieved zero connection 49. An enlarged end section 50 of the control slide valve member 42 with the same cross section as the collar 41 is located between the valve chamber 44 and a further valve chamber 51 which is connected by way of a control pressure line 53 with the pump pressure line 14. The control pressure surface 52 of the end section 50 which is adapted to be effectively acted upon by the pressure in the valve chamber 51, has the same cross section as the control pressure surface 47. A valve spring 54 engaging at the end section 50 is supported in the direction toward the housing and displaces the control slide valve member 42 into the illustrated end position 43 when the valve chambers 46 and 51 have the same pressure or the valve chamber 46 is pressure-relieved.

The line 53 for purposes of a rapid pressure decrease is connected with the oil sump 5 and with the standing secondary servo pump 13 by way of a throttle 62, or in the end position 45 of the valve 40 by way of a line 63 and a valve connection 61.

OPERATION

The operation of the described arrangement of FIG. 1 is as follows:

Tow Start

The vehicle stands still; the gear pumps 3 and 13 are pressureless. The shifting claw clutch 18 is closed or engaged by the compression spring 28 and the clutch claws 24 and 25 abut one another and are able to engage with one another during the first rotation of the control shaft 10.

If the vehicle is now push- or tow-started, then the gear pump 13 feeds and supplies the aggregates 8 with oil pressure. The valve chamber 51 of the control slide valve 40 is acted upon by the pressure of the pump pressure line 14 whereas the valve chamber 46 remains pressureless—protected by the check valve 7 and the throttle 38. The control slide valve 42 is accordingly in the end position 43, and the disengaging mechanism 11 remains in the working position 23.

If the driving engine now starts, then the gear pump 3 also feeds fluid pressure. The pressure of both pumps is kept at the same magnitude by the control valve 17 so that the valve spring 54 continues to hold the control slide valve member 42 in the end position 43 since pressure equilibrium prevails at the opposite ends of the valve.

If the vehicle with a rotating driving engine is now stopped again, then the gear pump 13 terminates its feed. The valve chamber 51 becomes pressureless as a result of which the control pressure at the control pressure surface 47 displaces the control slide valve member 42 into the other end position 45. As a result thereof, the working pressure chamber 30 is connected with the pump pressure line 6 of the gear pump 3 which continues to feed. As a result thereof, the working piston 29 disengages the shifting claw clutch 18, whence the gear pump 13 is disengaged.

In the embodiment of FIG. 2—which as to the rest of its structure is identical with the embodiment of FIG. 1—the disengaging mechanism 11 is additionally equipped with a locking mechanism generally designated by reference numeral 55 for fixing the disengaging position 26. A detent pin 56 is essentially provided which engages in a circumferential groove 57 of the working piston 29. The detent pin 56 which is displaceably guided in a bore 58 of the pump housing 39 that is perpendicular to the axis of rotation and which is retained in the engaging position by a spring 59, can be manually pulled back by way of a Bowden cable 60—which is extended into the engine or passenger space of the vehicle—so that the detent can be released. A bevelling 64 provided at the right edge of the circumferential groove 57 deflects the detent pin 56 under compression of the spring 59, when the working piston 29 is controllingly shifted into the disengaging position 26.

When reaching the disengaging position 26, the circumferential groove 57 is located in the projection of the detent pin 56 so that the latter can engage automatically into the groove 57. In this manner, errors during towing-away are prevented since the gear pump 13 remains disconnected permanently and is coupled with the transmission output shaft by way of the Bowden cable 60 only for push- or tow-starting.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An automatic change-speed transmission for vehicles, comprising first drive connection means between a transmission output shaft adapted to be coupled with vehicle wheels and a secondary servo-force generator means for the emergency supply of aggregates of transmission control and shifting means operating with a servo-force, disengaging means operable to disconnect said first drive connection means, second drive connection means between a transmission input shaft operable to be driven by a driving engine and a primary servo-force generator means for the normal supply of the aggregates, and servo-motor means actuating the disengaging means and operable to be displaced into a disengaging position in dependence on an operating magnitude of the primary servo-force generator means, in which the secondary servo-force generator means is effectively disconnected from the transmission output shaft but being in an operating position operable to establish the first drive connection means between the secondary servo-force generator means and the transmission output shaft when the rotational speed of the transmission input shaft approaches zero, characterized in that the servo-motor means is held in its working position by a holding control means which includes a control valve slide means operating in dependence on the servo-force of the primary servo-force generator means when the actual value of said servo-force lies below a necessary operating value.

2. A change-speed transmission according to claim 1, characterized in that the last-mentioned control means operates in dependence on the pressure in a pump pressure line of the primary servo-force generator means.

3. A change-speed transmission according to claim 2, characterized in that the primary servo-force generator means is a gear pump.

4. A change-speed transmission according to claim 3, characterized in that the servo-motor means is brought into its working position by the control means when the actual value of the servo-force lies below a requisite pressure of the pump pressure line of the secondary servo-force generator means.

5. A change-speed transmission comprising first drive connection means between a transmission output shaft adapted to be coupled with vehicle wheels and a secondary servo-force generator means for the emergency supply of aggregates of transmission control and shifting means operating with a servo-force, disengaging means operable to disconnect said first drive connection means, second drive connection means between a transmission input shaft operable to be driven by a driving engine and a primary servo-force generator means for the normal supply of the aggregates, and servo-motor means actuating the disengaging means and operable to be displaced into a disengaging position in dependence on an operating magnitude of the primary servo-force generator means, in which the secondary servo-force generator means is effectively disconnected from the transmission output shaft but being in an operating position operable to establish the first drive connection means between the secondary servo-force generator means and the transmission output shaft when the rotational speed of the transmission input shaft approaches zero, characterized in that the servo-motor means is brought into its operating position by a control means operating in dependence on the servo-force of the primary servo-force generator means when the actual value of said servo-force lies below a necessary operating value, and further characterized in that the control means dependent on the primary servo-force generator means is adapted to be overridden by a holding control means operating in dependence on the rotational speed of the transmission output shaft, which holds the servo-motor means in the operating position and releases its shifting control into the disengaging position only when the rotational speed approaches zero.

6. A change-speed transmission according to claim 5, in which the primary and secondary servo-force generator means operate into a common working line, in which means are interconnected for equalizing the difference of the servo-forces of the two servo-force generator means, characterized in that the holding control means is influenced by the servo-force of the secondary servo-force generator means and operates on an adjusting member of the control means dependent on the primary servo-force generator means, which is adapted to be displaced by spring force into the position corresponding to the working position.

7. A change-speed transmission according to claim 6, characterized in that the spring force is produced by a valve spring.

8. A change-speed transmission according to claim 7, characterized in that the adjusting member is a control slide valve member of the control means.

9. A change-speed transmission according to claim 6, characterized in that the disengaging means includes means for the automatic locking of its disengaging position, which are operable to be selectively unlocked.

10. A change-speed transmission according to claim 9, whose aggregates of the transmission control and shifting means and whose servo-motor means are operated with servo-pressure, and in which the common working pressure line is connected with a primary and secondary servo-force pump by way of one check valve each opening in the direction toward the aggregates, characterized in that a control slide valve means for the working pressure of the servo-motor means is provided with two oppositely directed control pressure surface means and is operable to be supported in one direction of the slide valve axis against elastic means, the control pressure surface means operating opposite the elastic means being operable to be acted on by the feed pressure between the primary servo-pressure pump and the associated check valve and the other control pressure surface means being operable to be acted upon by the feed pressure between the secondary servo-pressure pump and the associated check valve.

11. A change-speed transmission according to claim 10, characterized in that the secondary servo-pressure pump is a gear pump.

12. A change-speed transmission according to claim 11, characterized in that the servo-motor means is brought into its operating position by the control means when the actual value of the servo-force lies below a requisite pressure of the pump pressure line of the secondary servo-force generator means.

13. A change-speed transmission comprising first drive connection means between a transmission output shaft adapted to be coupled with vehicle wheels and a secondary servo-force generator means for the emergency supply of aggregates of transmission control and shifting means operating with a servo-force, disengaging means operable to disconnect said first drive connection means, second drive connection means between a transmission input shaft operable to be driven by a driving engine and a primary servo-force generator means for the normal supply of the aggregates, and servo-motor means actuating the disengaging means and operable to be displaced into a disengaging position in dependence on an operating magnitude of the primary servo-force generator means, in which the secondary servo-force generator means is effectively disconnected from the transmission output shaft but being in an operating position operable to establish the first drive connection means between the secondary servo-force generator means and the transmission output shaft when the rotational speed of the transmission input shaft approaches zero, characterized in that the servo-motor means is brought into its operating position by a control means operating in dependence on the servo-force of the primary servo-force generator means when the actual value of said servo-force lies below a necessary operating value, and also characterized in that the disengaging means includes means for the automatic locking of its disengaging position, which are operable to be selectively unlocked.

14. A change-speed transmission, comprising first drive connection means between a transmission output shaft adapted to be coupled with vehicle wheels and a secondary servo-force generator means for the emergency supply of aggregates of transmission control and shifting means operating with a servo-force, disengaging means operable to disconnect said first drive connection means, second drive connection means between a transmission input shaft operable to be driven by a driving engine and a primary servo-force generator means for the normal supply of the aggregates, and servo-motor means actuating the disengaging means and operable to be displaced into a disengaging position in dependence on an operating magnitude of the primary servo-force generator means, in which the secondary servo-force generator means is effectively disconnected from the transmission output shaft but being in an operating position operable to establish the first drive connection means between the secondary servo-force generator means and the transmission output shaft when the rotational speed of the transmission input shaft approaches zero, characterized in that the servo-motor means is brought into its operating position by a control means operating in dependence on the servo-force of the primary servo-force generator means when the actual value of said servo-force lies below a necessary operating value, whose aggregates of the transmission control and shifting means and whose servo-motor means are operated with servo-pressure, and in which the common working pressure line is connected with a primary and secondary servo force pump by way of one check valve each opening in the direction toward the aggregates, in that a control slide valve means for the working pressure of the servo-motor means is provided with two oppositely directed control pressure surface means and is operable to be supported in one direction of the slide valve axis against elastic means, the control pressure surface means operating opposite the elastic means being operable to be acted on by the feed pressure between the primary servo-pressure pump and the associated check valve and the other control pressure surface means being operable to be acted upon by the feed pressure between the secondary servo-pressure pump and the associated check valve.

15. A change-speed transmission according to claim 14, characterized in that the secondary servo-pressure pump is a gear pump.

16. A change-speed transmission, in which a common working pressure line is connected with a primary and secondary servo-force pump by way of one check valve each opening in the direction toward aggregates operable to be driven by a transmission input and output shaft, respectively, characterized in that a control slide valve means for the working pressure of a servo-motor means is provided with two oppositely directed control pressure surface means and is operable to be supported in one directon of the slide valve axis against elastic means, the control pressure surface means operating opposite the elastic means being operable to be acted on by the feed pressure between the primary servo-pressure pump and the associated check valve and the other control pressure surface means being operable to be acted upon by the feed pressure between the secondary servo-pressure pump and the associated check valve.

* * * * *